United States Patent
Lee et al.

(10) Patent No.: US 8,838,290 B2
(45) Date of Patent: Sep. 16, 2014

(54) CONTROL DEVICE AND METHOD FOR ADJUSTING FLIGHT DIRECTION OF UNMANNED AERIAL VEHICLE USING THE SAME

(75) Inventors: Hou-Hsien Lee, Tu-Cheng (TW); Chang-Jung Lee, Tu-Cheng (TW); Chih-Ping Lo, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 94 days.

(21) Appl. No.: 13/157,324

(22) Filed: Jun. 10, 2011

(65) Prior Publication Data

US 2012/0221176 A1 Aug. 30, 2012

(30) Foreign Application Priority Data

Feb. 24, 2011 (TW) .............................. 100106261 A

(51) Int. Cl.
*B64C 39/00* (2006.01)
*G05D 1/08* (2006.01)
*G05D 1/00* (2006.01)

(52) U.S. Cl.
CPC .................................. *G05D 1/0033* (2013.01)
USPC ....................................... 701/2; 701/3; 701/4

(58) Field of Classification Search
CPC ........... G05D 1/0033; B60R 2325/205; B60R 2325/304; B60R 25/04; B60R 25/102
USPC ..................... 701/2, 3, 4; 340/426.13; 700/31
See application file for complete search history.

(56) References Cited

U.S. PATENT DOCUMENTS

| 5,043,646 A * | 8/1991 | Smith et al. .................... 318/581 |
| 6,697,715 B1 * | 2/2004 | Freeman ........................... 701/2 |
| 8,019,447 B2 * | 9/2011 | Hoisington et al. ............ 700/31 |
| 2003/0193390 A1 * | 10/2003 | Muramatsu .............. 340/426.13 |
| 2006/0206244 A1 * | 9/2006 | Arvidsson ......................... 701/2 |
| 2008/0125920 A1 * | 5/2008 | Miles et al. ....................... 701/2 |
| 2010/0145556 A1 * | 6/2010 | Christenson et al. ........... 701/15 |

OTHER PUBLICATIONS

Nancy von Meyer, "Surveying and Land Records Glossary of Terms," 2002, The Urban and Regional Information Systems Association ISBN 0-916848-34-5.*

Chinese Patent No. CN201633887, Nov. 17, 2010, to Bai et al. (machine translation).*

* cited by examiner

*Primary Examiner* — Fadey Jabr
*Assistant Examiner* — Courtney Heinle
(74) *Attorney, Agent, or Firm* — Novak Druce Connolly Bove + Quigg LLP

(57) ABSTRACT

A method for adjusting a flight direction of an unmanned aerial vehicle (UAV) using a control device obtains a first direction of the UAV and a second direction of the control device, and calculates an angle deviation between the first direction and the second direction. The method further adjusts a control command of the UAV according to the angle deviation to obtain an adjusted control command, and transmits the adjusted control command to the UAV to control a flight direction of the UAV.

13 Claims, 5 Drawing Sheets

CONTROL DEVICE AND METHOD FOR ADJUSTING FLIGHT DIRECTION OF UNMANNED AERIAL VEHICLE USING THE SAME

BACKGROUND

1. Technical Field

Embodiments of the present disclosure relate to helicopter control technology, and particularly to a control device and method for adjusting a flight direction of an unmanned aerial vehicle (UAV) using the control device.

2. Description of Related Art

UAVs have been used to perform security surveillance by capturing images of a number of monitored scenes, and sending the captured images to a monitor computer. A flight direction of the UAV needs to be changed using a special controller. That is to say, if an administrator wants to change the flight direction of the UAV to the left, the administrator has to move a control lever of the special controller towards the left. However, if the flight direction of the UAV is opposite to a direction of the special controller, the administrator has to move the control lever of the special controller towards the right, to change the flight direction of the UAV to the left. Accordingly, it is inefficient to control the UAV, and a wrong control operation of the UAV may be implemented because of human error during the operation the special controller. Therefore, an efficient method for adjusting a flight direction of the UAV is desired.

DETAILED DESCRIPTION

All of the processes described below may be embodied in, and fully automated via, functional code modules executed by one or more general purpose electronic devices or processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Figure 1:
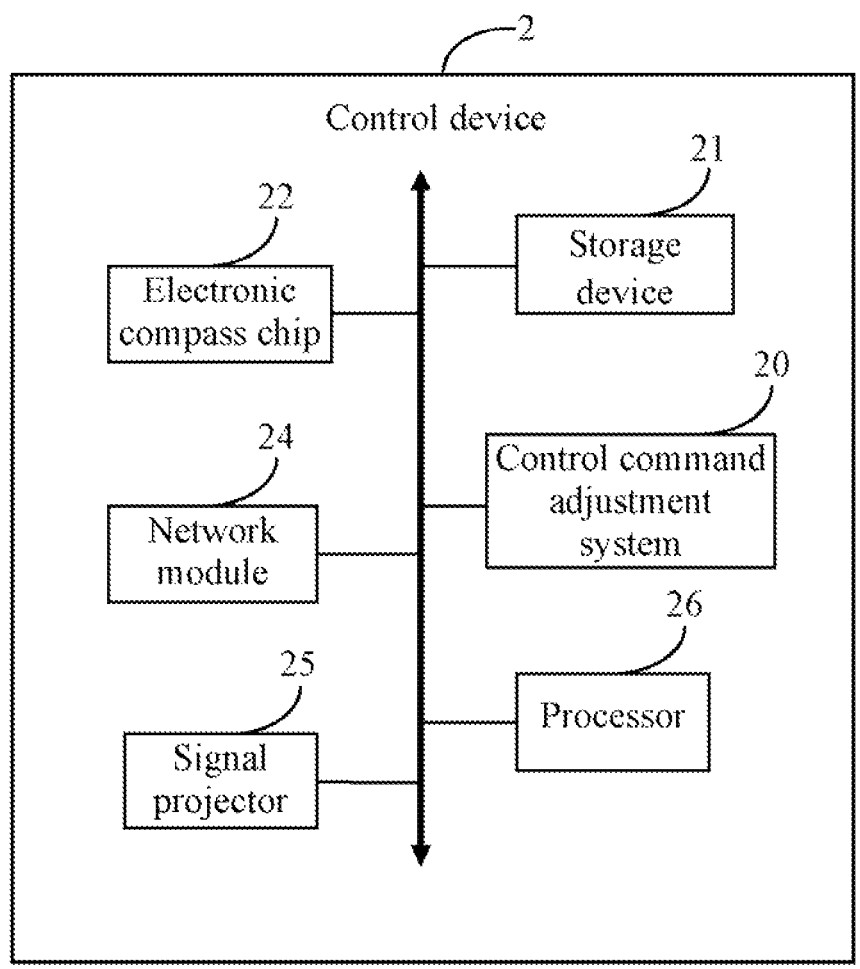
FIG. 1 is a block diagram of one embodiment of a control device.

FIG. 1 is a block diagram of one embodiment of a control device 2. In one embodiment, the control device 2 includes a control command adjustment system 20, a storage device 21, an electronic compass chip 22, a network module 24, a signal projector 25, and at least one processor 26. The control command adjustment system 20 may detect a direction of the control device 2 using the electronic compass chip 22, and adjust a flight direction of an unmanned aerial vehicle (UAV) according to the detected direction of the control device 2. A detailed description will be given in the following paragraphs.

In one embodiment, the control device 2 has a control lever to control the flight direction of the UAV in communication with the control device 2. For example, the control lever of the control device 2 may be moved left to control the UAV to move westwards.

Figure 2:
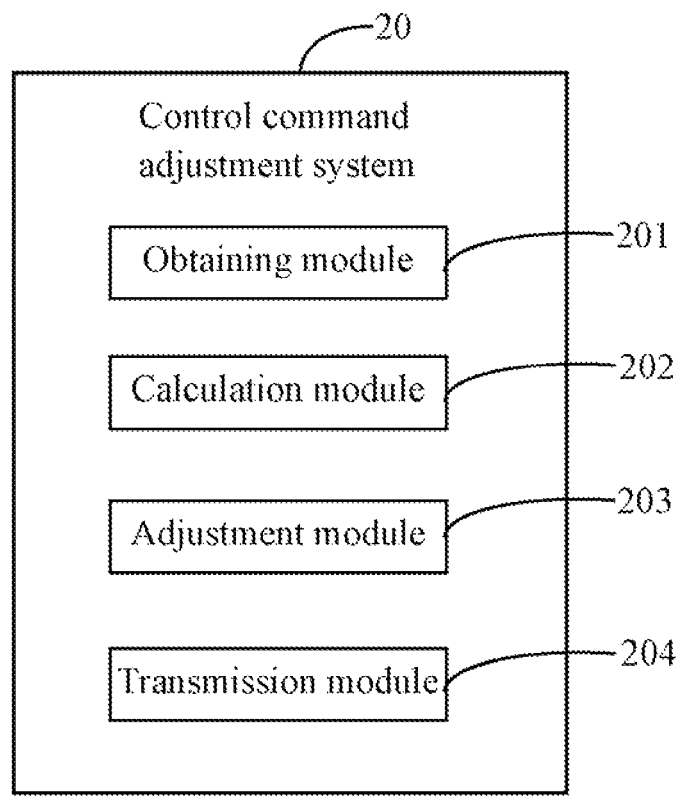
FIG. 2 is a block diagram of one embodiment of a control command adjustment system in the control device.

FIG. 2 is a block diagram of one embodiment of the control command adjustment system 20 in the control device 2. In one embodiment, the control command adjustment system 20 may include one or more modules, for example, an obtaining module 201, a calculation module 202, and an adjustment module 203, and a transmission module 204. The one or more modules 201-204 may comprise computerized code in the form of one or more programs that are stored in the storage device 21 (or memory). The computerized code includes instructions that are executed by the at least one processor 26 to provide functions for the one or more modules 201-204.

Figure 3:
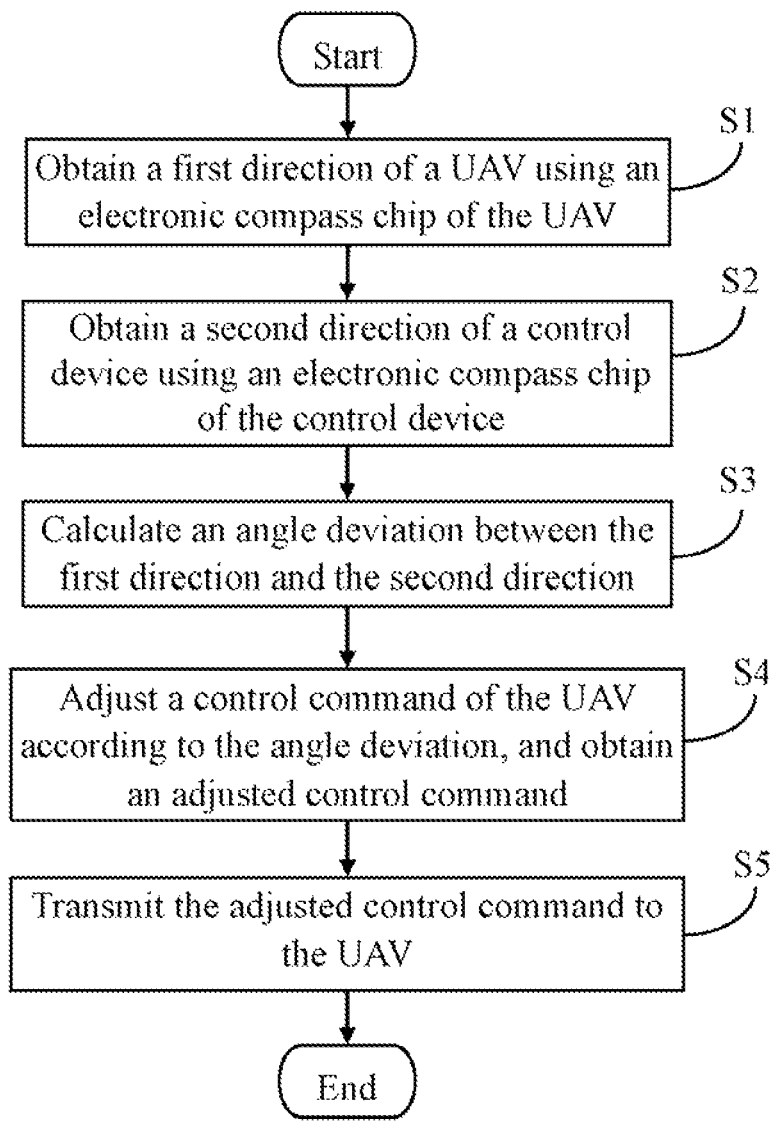
FIG. 3 is a flowchart of one embodiment of a method for adjusting a flight direction of an unmanned aerial vehicle (UAV) using the control device in FIG. 1.

FIG. 3 is a flowchart of one embodiment of a method for adjusting a control command of the UAV using the control device 2 in FIG. 1. Depending on the embodiment, additional blocks may be added, others removed, and the ordering of the blocks may be changed.

Figure 4:
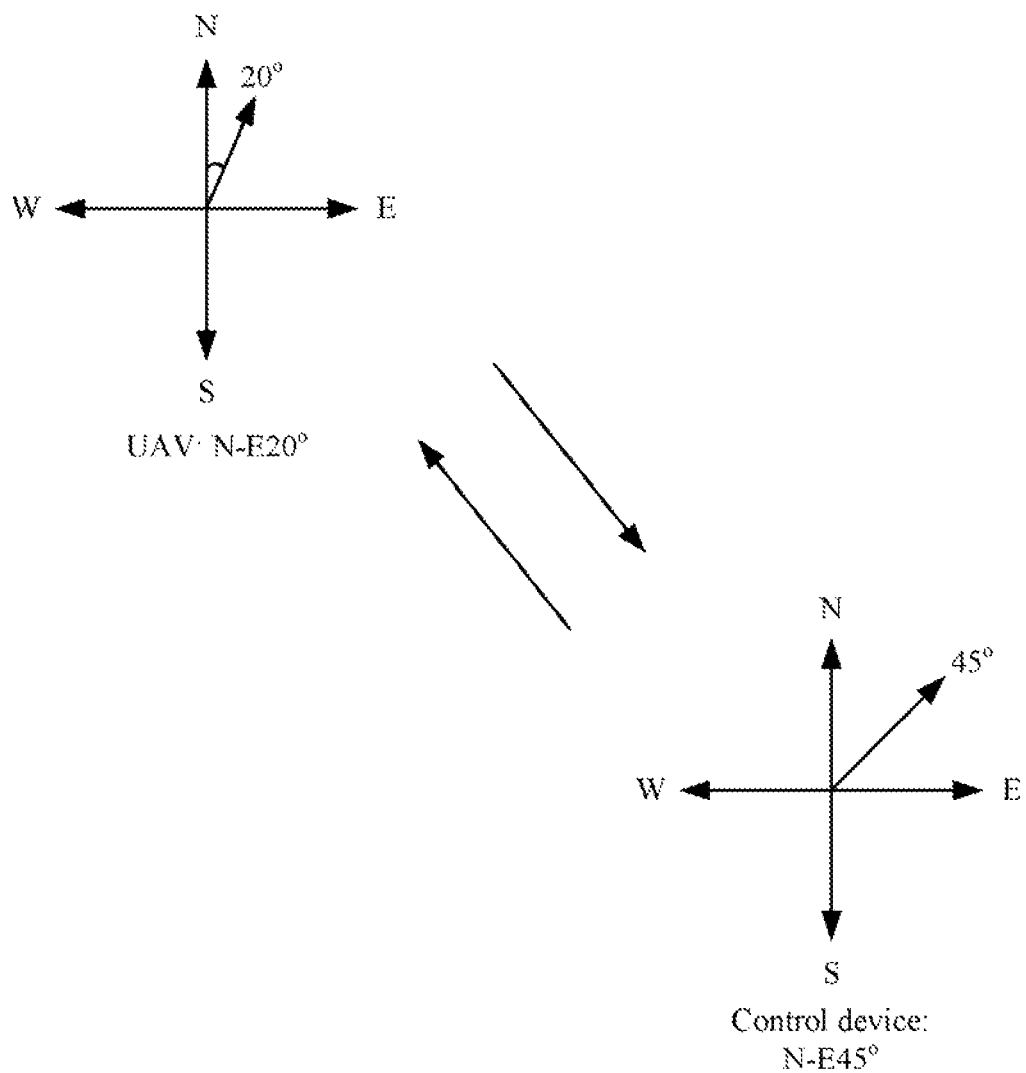
FIG. 4 is a schematic diagram of one embodiment of a first direction of the UAV and a second direction of the control device.

In block S1, the obtaining module 201 obtains a first direction of the UAV through the network module 24. The first direction of the UAV is obtained using an electronic compass chip installed in the UAV. In one embodiment, the first direction of the UAV includes a first cardinal direction, a first deflecting direction, and a first deflecting angle of the UAV. As an example shown in FIG. 4, the first direction of the UAV is north-east twenty degrees (N-E20°). The first cardinal direction of the UAV is towards north ("N"), the first deflecting direction of the UAV is towards east ("E"), and the first deflecting angle of the UAV is twenty degrees.

In block S2, the obtaining module 201 obtains a second direction of the control device 2 using the electronic compass chip 22. In one embodiment, the second direction of the control device 2 includes a second cardinal direction, a second deflecting direction, and a second deflecting angle of the control device 2. As an example shown in FIG. 4, the second direction of the control device 2 is north-east forty five degrees (N-E45°). The second cardinal direction of the control device 2 is towards north ("N"), the second deflecting direction of the control device 2 is towards east ("E"), and the second deflecting angle of the control device 2 is forty five degrees.

Figure 5:
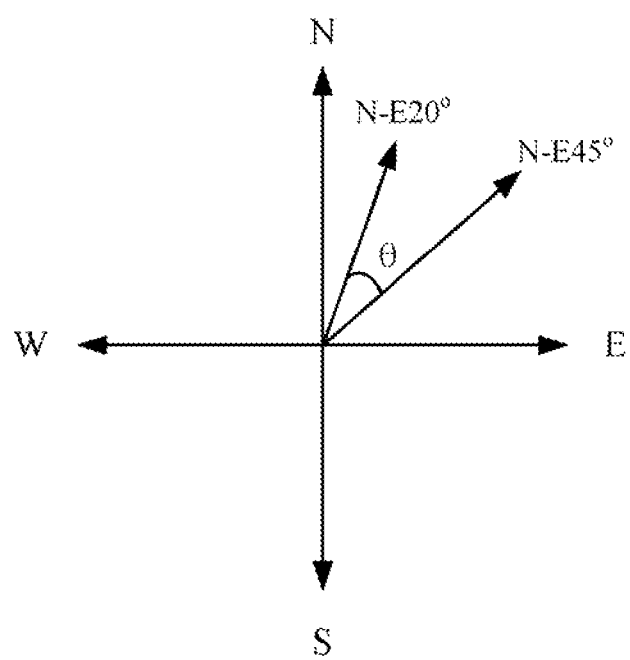
FIG. 5 is a schematic diagram of one embodiment of an angle deviation between the first direction of the UAV and the second direction of the control device.

In block S3, the calculation module 202 calculates an angle deviation between the first direction of the UAV and the second direction of the control device 2. Referring to FIG. 5, "θ" represents the angle deviation between the first direction and the second direction, θ=45°−20°=25°.

In block S4, the adjustment module 203 adjusts a control command of the UAV according to the angle deviation, and obtains an adjusted control command. In one embodiment, the control command is used to control a flight direction of the UAV. For example, the adjustment module 203 adjusts the first direction of the UAV to the second direction of the control device 2 according to the angle deviation. For example, as shown in FIG. 5, if an initial flight direction the control command of the UAV is north, an adjusted flight direction of the adjusted control command is north-east twenty five degrees (N-E25°).

In block S5, the transmission module 204 transmits the adjusted control command to the UAV through the signal projector 25, to control the flight direction of the UAV.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for adjusting a flight direction of an unmanned aerial vehicle using a control device, the method comprising:
    obtaining a first direction of the unmanned aerial vehicle (UAV) using an electronic compass chip of the UAV;
    obtaining a second direction of the control device using an electronic compass chip of the control device;
    calculating an angle deviation between the first direction of the UAV and the second direction of the control device using a processor of the control device;
    adjusting a control command of the control device by adjusting the first direction of the UAV to the second direction of the control device according to the angle deviation between the first direction and the second direction, and obtaining an adjusted control command; and
    transmitting the adjusted control command to the UAV to control the flight direction of the UAV, the adjusted control command being transmitted to the UAV through a signal projector of the control device.

2. The method according to claim 1, wherein the first direction of the UAV comprises a first cardinal direction, a first deflecting direction, and a first deflecting angle of the UAV.

3. The method according to claim 1, wherein the second direction of the control device comprises a second cardinal direction, a second deflecting direction, and a second deflecting angle of the control device.

4. The method according to claim 1, wherein the first direction of the UAV is obtained through a network module of the control device.

5. A control device in communication with an unmanned aerial vehicle (UAV), comprising:
    a storage device;
    an electronic compass chip;
    at least one processor; and
    one or more modules that are stored in the storage device and are executed by the at least one processor, the one or more modules comprising instructions:
    to obtain a first direction of the UAV using an electronic compass chip of the UAV;
    to obtain a second direction of the control device using the electronic compass chip of the control device;
    to calculate an angle deviation between the first direction of the UAV and the second direction of the control device;
    to adjust a control command of the control device by adjusting the first direction of the UAV to the second direction of the control device according to the angle deviation between the first direction and the second direction, and obtain an adjusted control command; and
    to transmit the adjusted control command to the UAV to control a flight direction of the UAV, the adjusted control command to be transmitted to the UAV through a signal projector of the control device.

6. The control device according to claim 5, wherein the first direction of the UAV comprises a first cardinal direction, a first deflecting direction, and a first deflecting angle of the UAV.

7. The control device according to claim 5, wherein the second direction of the control device comprises a second cardinal direction, a second deflecting direction, and a second deflecting angle of the control device.

8. The control device according to claim 5, wherein the first direction of the UAV is obtained through a network module of the control device.

9. A non-transitory storage medium having stored thereon instructions that, when executed by a processor of a control device, causes the processor to perform a method for adjusting a flight direction of an unmanned aerial vehicle using the control device, the method comprising:
    obtaining a first direction of the unmanned aerial vehicle (UAV) using an electronic compass chip of the UAV;
    obtaining a second direction of the control device using an electronic compass chip of the control device;
    calculating an angle deviation between the first direction of the UAV and the second direction of the control device;
    adjusting a control command of the control device by adjusting the first direction of the UAV to the second direction of the control device according to the angle deviation between the first direction and the second direction, and obtaining an adjusted control command; and
    transmitting the adjusted control command to the UAV to control the flight direction of the UAV, the adjusted control command being transmitted to the UAV through a signal projector of the control device.

10. The non-transitory storage medium according to claim 9, wherein the first direction of the UAV comprises a first cardinal direction, a first deflecting direction, and a first deflecting angle of the UAV.

11. The non-transitory storage medium according to claim 9, wherein the second direction of the control device comprises a second cardinal direction, a second deflecting direction, and a second deflecting angle of the control device.

12. The non-transitory storage medium according to claim 9, wherein the medium is selected from the group consisting of a hard disk drive, a compact disc, a digital video disc, and a tape drive.

13. The non-transitory storage medium according to claim 9, wherein the first direction of the UAV is obtained through a network module of the control device.

* * * * *